United States Patent [19]
Takafuji et al.

[11] Patent Number: 5,037,196
[45] Date of Patent: Aug. 6, 1991

[54] PROJECTION-TYPE COLOR DISPLAY APPARATUS

[75] Inventors: Yutaka Takafuji, Nara; Youichi Kondoh, Tenri, both of Japan

[73] Assignee: Sharp Kabushiki Kaisha, Osaka, Japan

[21] Appl. No.: 261,006

[22] Filed: Oct. 21, 1988

[30] Foreign Application Priority Data

Oct. 21, 1987 [JP] Japan .................................. 62-267458
Oct. 21, 1987 [JP] Japan .................................. 62-267459

[51] Int. Cl.$^5$ .............................................. G03B 21/00
[52] U.S. Cl. ...................................... 353/122; 353/84
[58] Field of Search .......................... 353/122, 31, 84; 350/331 R, 117; 358/236

[56] References Cited

U.S. PATENT DOCUMENTS

| 3,912,386 | 10/1975 | Gorog et al. | 353/122 |
| 3,918,803 | 11/1975 | Friesem | 353/122 |
| 4,222,641 | 9/1980 | Stolov | 353/122 |
| 4,368,963 | 1/1983 | Stolov | 353/122 |
| 4,770,525 | 9/1988 | Umeda et al. | 353/122 |

OTHER PUBLICATIONS

Copy of European Search Report.
2244 Research Disclosure (1982), July, No. 219, Havant Hamshire, Great Britain, pp. 254–256.
IBM Technical Disclosure Bulletin, vol. 25, No. 7A, Dec. 1982, "Dispaly/TV–Controlled Filter/Lens Arrangement", pp. 3492–3493.
2287 Soviet Journal of Quantum Electronics, vol. 7, No. 9 (Sep. 1977), "Controlled Phase Transparencies in Coherent-Optical Systems Performing Walsh and Hilbert Transformations", pp. 1089—1-93.

Primary Examiner—William A. Cuchlinski, Jr.
Assistant Examiner—C. W. Fulton

[57] ABSTRACT

A projection-type color display apparatus has an optical system which includes a light source. There is at least one projection lens and an optical cell, for example, an LCD, that forms a monochromatic display image. A screen is used onto which an enlarged color display image is projected. Also included is a color filter which has picture elements of two or more colors and the color filter is located separately from the electro-optical cell.

4 Claims, 3 Drawing Sheets

PROJECTION-TYPE COLOR DISPLAY APPARATUS

BACKGROUND OF THE INVENTION

1. Field of the invention

This invention relates to a display apparatus, and more particularly, to a color display apparatus where a display image formed by an electro-optical cell is enlarged and projected onto a screen.

2. Description of the prior art

FIG. 5 shows the structure of a conventional liquid-crystal color display cell. This structure is the same whether the liquid-crystal display cell is driven by an active matrix drive or a multiplex drive. The substrate 101 on one side is provided with color picture elements 500a, 500b, 500c, . . . , which are in the form of a high-accuracy mosaic pattern of red, green, and blue colors. On the surface of the color picture elements, there is a transparent electrode 201 made of a transparent conductive material such as indium tin oxide (ITO) or the like. On the surface of 201, there is formed a molecular alignment film 301 that is made of polyimide or the like. The molecular alignment film 301 having been treated by an aligning treatment such as rubbing, etc. The liquid-crystal layer 400 is in contact with this molecular alignment film 301. On the surface of the other substrate 100, there are formed transparent electrodes 200a, 200b, 200c, . . . , and on their tops, there is a molecular alignment film 300 that has been treated by an aligning treatment as described above. The liquid-crystal layer 400 is in contact with this molecular alignment film 300.

In general, the directions of the molecular alignment on the two substrates 100 and 101 can be rotated through an angle of 90° to each other. The liquid-crystal cell mentioned above is inserted between two polarizing plates. If the polarizing axes of the two polarizing plates are parallel to each other and the liquid crystal is the nematic one with positive dielectric anisotropy, the portions of the cell to which a voltage is not applied do not transmit light. For example, in FIG. 5, when the voltage above the threshold voltage is applied to the space between the electrode 200b and the transparent electrode 201 only green light can pass through the corresponding portion of the cell, and the display will be green. In this way, the color display image is produced by controlling the transmittance of the light that can pass through the color picture elements 500a, 500b, 500c, . . . of red, green, and blue colors.

In the liquid-crystal color display cell described above, the color picture elements 500a, 500b, 500c, . . . , are in the form of a mosaic pattern and are integrated with the substrate 101, so that when these color picture elements 500a, 500b, 500c, . . . , are formed on the substrate 101, with approximately the same accuracy in production as is needed as for the picture element electrodes 200a, 200b, 200c, . . . Usually, a color filter is produced as follows: by photolithography, a filter substrate made of gelatin or the like is coated with a resist layer that has openings only in the desired regions, and the coloring step with a pigment is repeated at least three times. Because the process of manufacture is so complicated, the production cost of the color filter is extremely high. If the resistance to heat and to chemicals and similar properties of the matrix such as gelatin and the like are considered, the serious limitations to each step of washing, formation of the transparent electrodes, and formation of the molecular alignment film are apparent.

The production yield of the final liquid-crystal display cell is evaluated as the product of the yield of the substrate with a color filter and the yield at the time of the attachment to the other substrate, so it is difficult to attain a high production yield.

A liquid-crystal display cell of this type is used for many applications, such as a projection-type color display apparatus shown in FIG. 6. In this color display apparatus, the liquid-crystal display cell 44 is illuminated with light by means of the reflecting mirror 14, light source 24, and condenser lens 34, and the color display image produced on the liquid-crystal display cell 44 is enlarged and projected onto the screen 76 via the projection lens 54. In order to realize sufficiently high brightness of the display image on the screen, the intensity of light which enters the liquid-crystal display cell 44 must be very high, which causes fading of the color filter.

SUMMARY OF THE INVENTION

The projection-type color display apparatus of this invention, overcomes the above-discussed and numerous other disadvantages and deficiencies of the prior art. An apparatus of the present invention includes an optical system containing a light source and at least one set of projection lenses. There is an electro-optical cell that forms a monochromatic display image and a color filter disposed separately from the electro-optical cell having picture elements of two or more colors. An enlarged color image is projected on a screen.

In a preferred embodiment, the electro-optical cell is illuminated with light from the light source to provide a monochromatic display image, and the monochromatic display image is converted into a color display image via the color filter.

In another preferred embodiment, the electro-optical cell is illuminated with light from the light source to provide an optical image in the form of a mosaic pattern of two or more colors, and the optical image is converted into a color display image via the electro-optical cell.

In a further preferred embodiment, the electro-optical cell forms a display image by controlling the transmittance of the light that passes through picture element electrodes of the electro-optical cell.

In still another preferred embodiment, the electro-optical cell is a liquid-crystal display cell.

Thus, the invention described herein achieves the objectives which are

Providing a projection-type color display apparatus in which the color filter and the electro-optical cell are disposed separately, so that the color filter can be readily made by a simple photographic or printing process, resulting in a lower production cost;

Providing a projection-type color display apparatus in which the color filter and the electro-optical cell are disposed separately, so that because high accuracy is not needed for the adhesion of the two substrates, the liquid-crystal display cell that gives a high production yield can be used as the electro-optical cell;

Providing a projection-type color display apparatus in which the color filter and the electro-optical cell are disposed separately, so that complicated processes such as washing of the color filter layer, formation of a molecular alignment film on the surface of the color filter, formation of transparent electrodes, and the like are not needed for the manufacture of the liquid-crystal display cell;

Providing a projection-type color display apparatus in which the color filter and the electro-optical cell are disposed separately, so that there is no restrictions on the steps of manufacture such as washing, formation of transparent electrodes, formation of a molecular alignment film, and the like;

Providing a projection-type color display apparatus in which the light to be incident upon the color filter is the weaker light of an enlarged display image that has been provided by the electro-optical cell, so that the color filter does not have a tendency to fade.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

EXAMPLE 1

Figure 1:
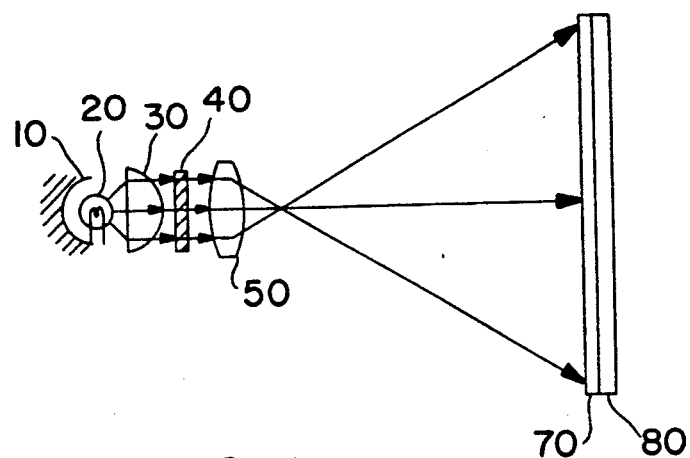
FIG. 1 is a schematic view showing a projection-type color display apparatus of the disclosed invention.

FIG. 1 shows an example of the projection-type color display apparatus of this invention. In this figure, reference numeral 10 is a reflecting mirror, reference numeral 20 is the light source, reference numeral 30 is a condenser lens, reference numeral 40 is a liquid-crystal display cell, reference numeral 50 is a projection lens, reference numeral 70 is a color filter, and reference numeral 80 is a screen.

The reflecting mirror 10, the light source 20, the condenser lens 30, and the projection lens 50 form an optical system by which the display image formed on the liquid-crystal display cell 40 is enlarged and projected onto the screen 80.

Figure 5:
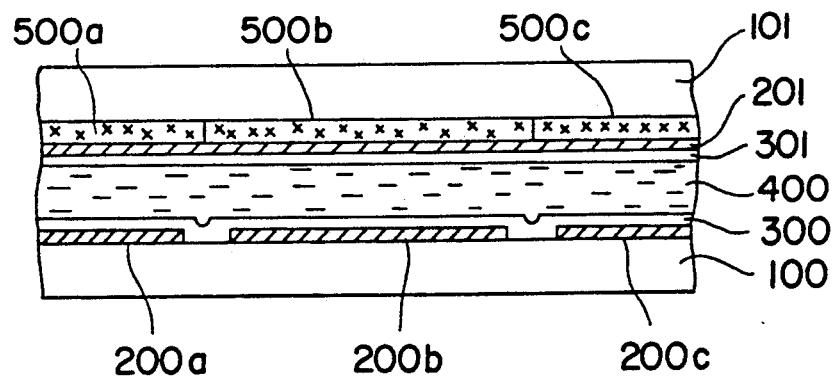
FIG. 5 is a fragmentary sectional view showing a conventional liquid-crystal color display cell.

The liquid-crystal display cell 40 forms a monochromatic display image by controlling the transmittance of the light that passes through the picture element electrodes by means of an electrical signal. The arrangement of the picture element electrodes of the liquid-crystal display cell 40 is similar to the picture-element arrangement of the color filter 70. By using an active matrix drive including thin-film transistors (TFTs), the applied voltage between the picture element electrodes formed in a matrix arrangement on the surface of one of the substrates and the electrodes formed on the entire surface of the other substrate is controlled, and depending upon the electro-optical characteristics of the polarizing plates and the liquid-crystal layer between the two substrates, a black-and-white stepwise pattern is formed by the liquid-crystal display cell 40. This liquid-crystal display cell 40 forms a monochromatic display image, and does not have a color filter like that used in the liquid-crystal color display cell shown in FIG. 5. This liquid-crystal display cell 40 may also be driven by a multiplex drive, and may give a display in a black-and-white stepwise pattern, as well.

The color filter 70 is disposed so as to be attached to the screen 80 onto which the enlarged final image is projected. This color filter 70 is arranged in a mosaic pattern of color picture elements that can selectively transmit light of red, green, and blue primary colors.

The operation of this color display apparatus is explained as follows. The light emitted from the light source 20 and the light reflected from the reflecting mirror 10 are collected by the condenser lens 30, and fed into the liquid-crystal display cell 40. The liquid-crystal display cell 40 emits monochromatic image light by the transmission of light through it; the black-and-white image formed on the liquid-crystal display cell 40 is enlarged via the projection lens 50, and the black-and-white image is colored by passing through the color filter 70. Thus, the resulting colored display image is projected onto the screen 80.

With this construction, because the final image on the screen 80 is an enlargement of the picture element pattern of the liquid-crystal display cell 40, the color filter 70 that is attached to the screen 80 can be made so that the arrangement pitch of the picture elements in the three primary colors of red, green, and blue is increased by the enlargement ratio attained by the projection lens 50. Therefore, the need for accuracy during the manufacture of the color filter 70 is greatly reduced, and it is possible to produce the color filter 70 by a printing process. For example, on the surface of a polyester sheet, color filter 70 can be formed by offset printing at the longitudinal and transverse pitches of 1 mm of the color picture elements.

Figure 6:
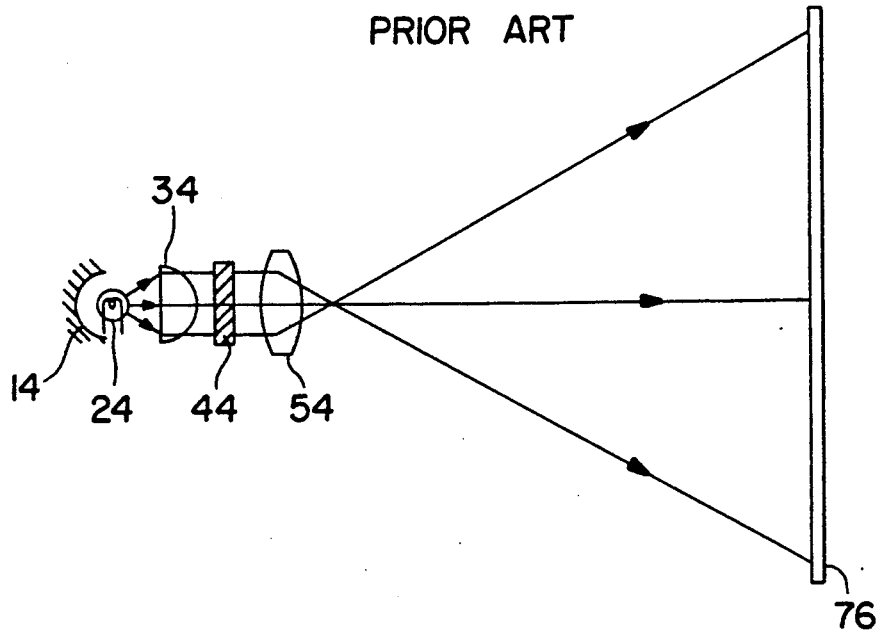
FIG. 6 is a schematic view showing a conventional projection-type color display apparatus.

The color filter 70 manufactured by the method described above is attached to the screen 80, and the display image from the liquid-crystal display cell 40 that has picture element electrodes with the longitudinal and transverse pitches of 200 $\mu$m is enlarged five times and projected on the screen 80. The color reproducibility and display contrast obtained are the same as when a display is provided by the conventional projection-type color display apparatus shown in FIG. 6, which apparatus uses a liquid-crystal display cell containing a color filter.

EXAMPLE 2

Figure 2:
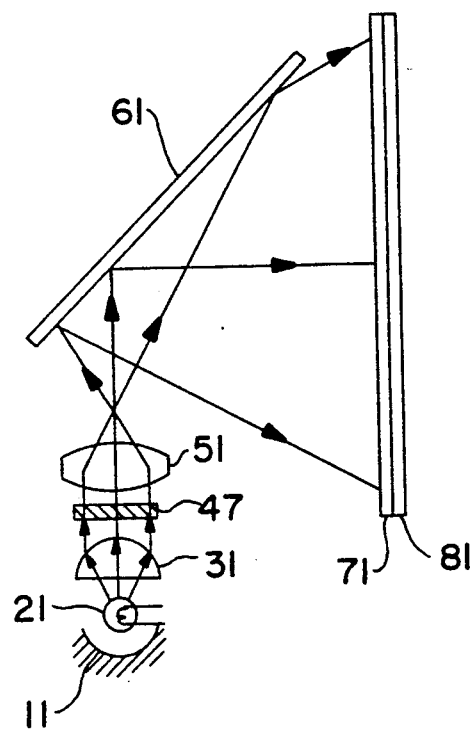
FIGS. 2 to 4 are schematic views showing three different types of projection-type color display apparatuses of the disclosed invention, respectively.

FIG. 2 shows another example of the projection-type color display apparatus of this invention. In this figure, reference numeral 11 is a reflecting mirror, reference numeral 21 is the light source, reference numeral 31 is a condenser lens, reference numeral 41 is a liquid-crystal display cell, reference numeral 51 is a projection lens, reference numeral 61 is a reflecting mirror, reference numeral 71 is a color filter, and reference numeral 81 is a transmission-type screen.

The liquid-crystal display cell 41 has the same structure as the liquid-crystal display cell 40 of Example 1. The arrangement of the picture element electrodes of the liquid-crystal display cell 41 is similar to the picture-element arrangement of the color filter 71. The reflecting mirror 61 reflects the image light that passes through the projection lens 51 to the transmission-type screen 81.

The transmission-type screen 81 is printed with the color filter 71 that is made of color picture elements in the form of a mosaic pattern of the three primary colors red, green, and blue on its light-receiving surface.

The light emitted from the light source 21 and the light reflected from the reflecting mirror 11 are collected by the condenser lens 31, and then used to illuminate the liquid-crystal display cell 41. The monochromatic image light that has passed through the liquid-crystal display cells 41 passes through the projection lens 51, and is reflected once more by the reflecting mirror 61, being guided to the color filter 71 on the transmission-type screen 81. The black-and-white image is colored by this color filter 71, and is projected in enlarged form to the transmission-type screen 81. Observers view the screen 81 from the right side of the figure. In this case, the order of the arrangement of the color filter 71 and of the screen 81 is not necessarily that shown in FIG. 2, but may be in the reverse order. Moreover, instead of the color filter 71 being disposed on the screen 81, it can be attached to the reflecting surface of the reflecting mirror 61.

EXAMPLE 3

Figure 3:
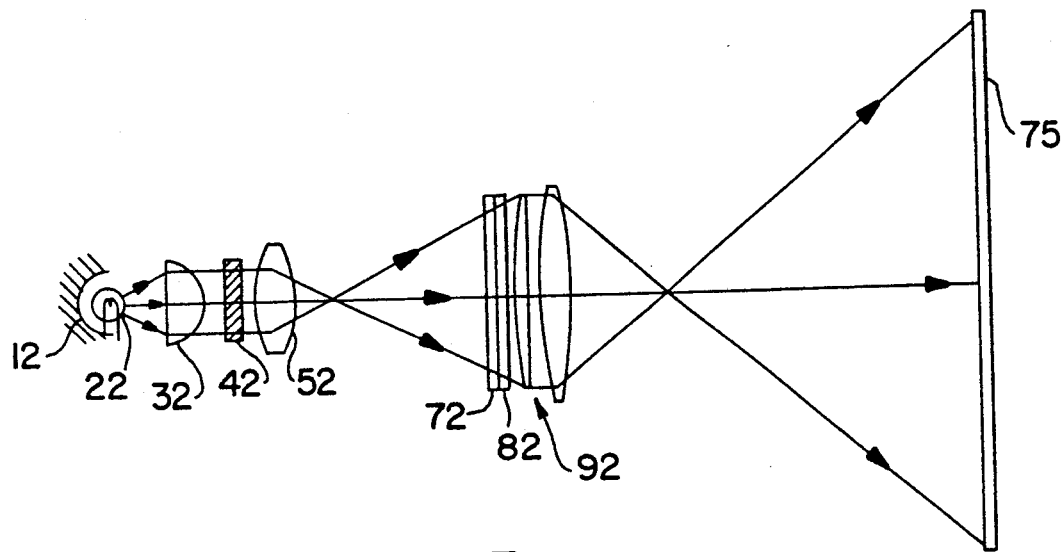

FIG. 3 shows still another example of the projection-type color display apparatus of this invention. In this figure, reference numeral 12 is a reflecting mirror, reference numeral 22 is the light source, reference numeral 32 is a condenser lens, reference numeral 42 is a liquid-crystal display cell, reference numeral 52 is a projection lens, reference numeral 72 is a color filter, reference numeral 82 is a transmission-type screen, reference numeral 92 is a set of projection lenses, and reference numeral 75 is a screen.

The structure of the liquid-crystal display cell 42 is the same as that of the liquid-crystal display cell 40 of Example 1. The arrangement of the picture element electrodes of the liquid-crystal display cell 42 is similar to the picture-element arrangement of the color filter 72. The transmission-type screen 82 is printed with the color filter 72 that is made of color picture elements in the form of a mosaic pattern of the three primary colors red, green, and blue. Here, the order of arrangement of the color filter 72 and of the screen 82 is not necessarily that shown in FIG. 3, but may be in the reverse order. The projection lenses 92 are disposed in close proximity to the transmission-type screen 82. The screen 75 is placed on the right side of these projection lenses 92 in this figure. The arrangements of the reflecting mirror 12, light source 22, condenser lens 32, liquid-crystal display cell 42, and projection lens 52 are the same as those of the reflecting mirror 10, light source 20, condenser lens 30, liquid-crystal display cell 40, and projection lens 50, respectively, of Example 1.

The display image of the liquid-crystal display cell 42 is projected in enlarged form onto the transmission-type screen 82 via the projection lens 52. The monochromatic image light that passes through the projection lens 52 is colored by its passage through the color filter 72, and the resulting color display image is projected onto the transmission-type screen 82. The color display image that is formed on the transmission-type screen 82 is then projected in enlarged form onto the screen 75 by the projection lenses 92. In this Example, there are provided the projection lenses 92 by which the color display image on the screen 82 is enlarged and projected on the screen 75. Thus, it is possible to project a color display image that has been enlarged to any desired size. Of course, a color filter can be provided on the screen 75, but in this case, it is impossible to change the enlargement ratio of projection. However, the decreased contrast arising from ambient light can be improved.

EXAMPLE 4

Figure 4:
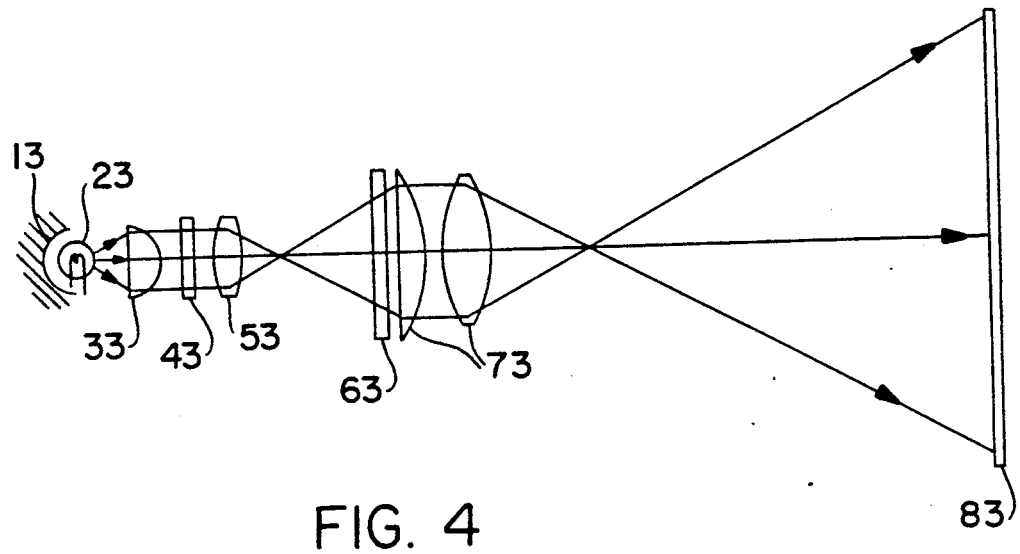

FIG. 4 shows yet another example of the projection-type color display apparatus of this invention. In this figure, reference numeral 13 is a reflecting mirror, reference numeral 23 is the light source, reference numeral 33 is a condenser lens, reference numeral 43 is a color filter, reference numeral 53 is a projection lens, reference numeral 63 is a liquid-crystal display cell, reference numeral 73 is a set of projection lenses, and reference numeral 83 is a screen.

The condenser lens 33 is provided for the purpose of collecting the light emitted from the light source 23 and the light reflected from the reflecting mirror 13, and projecting it uniformly to the color filter 43.

The color filter 43 has color picture elements that are arranged in the form of a mosaic pattern of two or more colors, for example, red, green, and blue primary colors in the case of three colors. The size of this color filter 43 is less than the size of the liquid-crystal display cell 63 that will be mentioned below. The optical image in the form of a mosaic pattern of red, green, and blue light that has passed through the color picture elements of the color filter 43 is enlarged and projected onto the liquid-crystal display cell 63 via the projection lens 53.

The liquid-crystal display cell 63 forms a monochromatic display image by controlling the transmittance of the light that passes through the picture element electrodes by means of an electrical signal. The arrangement of the picture element electrodes of this liquid-crystal display cell 63 is similar to the picture-element arrangement of the color filter 43. This liquid-crystal display cell 63 is driven by an active matrix drive by means of the TFTs, and the applied voltage between the picture element electrodes arranged in the form of a matrix arrangement on the surface of one of the substrates and the opposite electrode that is formed over the entire surface of the other substrate is controlled, and depending upon the electro-optical characteristics of the polarizing plates and the liquid-crystal layer between the two substrates, a black-and-white stepwise pattern is formed. This liquid-crystal display cell 63 forms a monochromatic display image, and does not have a color filter of a liquid-crystal colored display cell like that shown in FIG. 5. This liquid-crystal display cell 63 can also form a black-and-white stepwise pattern by a multiplex drive.

The color display image from the liquid-crystal display cell 63 is enlarged and projected onto the screen 83 via the projection lenses 73.

The operation of this color display apparatus will be explained below. Both the emitted light from the light source 23 and the light reflected from the reflecting mirror 13 are collected by the condenser lens 33, and used to illuminate the color filter 43. The optical image in the form of a mosaic pattern of red, green, and blue colors that arises from the light that has passed through the color filter 43 is formed on the liquid-crystal display cell 63 by the projection lens 53. At this time, there is a monochromatic display image formed by the liquid-crystal display cell 63. Thus, the picture elements of this liquid-crystal display cell 63 gives rise to a color display image corresponding to the monochromatic display image made on the liquid-crystal display cell 63. The color display image of this liquid-crystal display cell 63 is enlarged and projected onto the screen 83 by the projection lenses 73. Thus, the monochromatic display image formed by the liquid-crystal display cell 63 is colored, and is enlarged and projected as a color display image onto the screen 83.

The color filter 43 may be smaller than the liquid-crystal display cell 63. Thus, the color filter can be readily produced by the exposure of a low-cost color positive film once to light and by the attachment to a transparent substrate made of glass or the like. If the optical image from the color filter 43 is projected after reduction in size onto the liquid-crystal display cell 63, the color filter 43 can be made larger than the liquid-crystal display cell 63. Thus, it is possible to produce the color filters at low cost using printing process.

In all of the four examples given above, it is possible to use a halogen lamp, fluorescent lamp, xenonarc lamp, metal halide lamp, fluorescent mercury-vapor lamp, or the like as the light source. Also, the electro-optical cell that forms the display image is not limited to a liquid-crystal display cell; it is also possible to use a PLZT display panel (light-permeable ceramic display panel) or a light bulb with a mechanical shutter.

Moreover, all of the lenses used, such as condenser lenses and projection lenses, are not limited to single lenses; it is also possible to use compound lenses to avoid various aberrations.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A projection color display apparatus comprising:
   an optical system including a light source and at least one projection lens;
   an electro-optical cell for forming a monochromatic display image;
   a color filter having picture elements of two or more colors, said color filter located separately from said electro-optical cell with said at least one projection lens located between said color filter and the electro-optical cell; and
   a screen onto which an enlarged color display image can be projected; wherein said color filter is located on the screen.

2. The projection apparatus according to claim 1, wherein there is a reflecting mirror between said at least one projection lens and a screen.

3. A projection-type color display apparatus comprising:
   an optical system containing a light source and at least one projection lens;
   an electro-optical cell that forms a monochromatic display image;
   a color filter having picture elements of two or more colors; and
   a screen onto which an enlarged color display image is projected; wherein said projection lens is disposed between the electro-optical cell and the color filter so that a monochromatic display image formed by the electro-optical cell is enlarged via the projection lens and projected substantially onto the color filter wherein said color filter is located on the screen.

4. The projection apparatus according to claim 3, wherein there is a reflecting mirror between the projection lens and the screen.

* * * * *